(12) United States Patent
Zhang

(10) Patent No.: US 12,169,520 B2
(45) Date of Patent: Dec. 17, 2024

(54) MACHINE LEARNING SELECTION OF IMAGES

(71) Applicant: Intuit Inc., Mountain View, CA (US)

(72) Inventor: Jessica Zhang, Los Angeles, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/103,476

(22) Filed: Jan. 30, 2023

(65) Prior Publication Data

US 2024/0256597 A1 Aug. 1, 2024

(51) Int. Cl.
*G06F 16/583* (2019.01)
*G06F 16/951* (2019.01)
*G06F 40/40* (2020.01)

(52) U.S. Cl.
CPC .......... *G06F 16/583* (2019.01); *G06F 16/951* (2019.01); *G06F 40/40* (2020.01)

(58) Field of Classification Search
None
See application file for complete search history.

(56) References Cited

U.S. PATENT DOCUMENTS

| | | | | |
|---|---|---|---|---|
| 11,068,530 B1* | 7/2021 | Oringer | ................ | G06F 40/134 |
| 11,516,158 B1* | 11/2022 | Luzhnica | ................ | H04L 51/02 |
| 11,710,000 B1* | 7/2023 | Cuan | ................ | G06F 40/40 |
| | | | | 709/206 |
| 2008/0244022 A1* | 10/2008 | Johnson | ................ | H04L 51/10 |
| | | | | 709/206 |
| 2009/0282114 A1* | 11/2009 | Feng | ................ | G06Q 10/107 |
| | | | | 709/206 |
| 2016/0259815 A1* | 9/2016 | Song | ................ | G06F 18/22 |
| 2017/0235360 A1* | 8/2017 | George-Svahn | ..... | G02B 27/017 |
| | | | | 345/173 |
| 2023/0073843 A1* | 3/2023 | Sampaio De Rezende | ................ | |
| | | | | G06V 10/82 |
| 2023/0153522 A1* | 5/2023 | Cho | ................ | G06V 10/82 |
| | | | | 382/159 |
| 2023/0196716 A1* | 6/2023 | Feng | ................ | G06V 10/443 |
| | | | | 382/209 |

OTHER PUBLICATIONS

Openai.com; "CLIP:Connecting Text and Images"; Jan. 5, 2021 https://openai.com/blog/clip, 2 pages.

* cited by examiner

*Primary Examiner* — Giuseppi Giuliani
(74) *Attorney, Agent, or Firm* — Lathrop GPM LLP

(57) ABSTRACT

A method including receiving an input and embedding the input into a first data structure that defines first relationships among images and texts. The method also includes comparing the first data structure to an index including a second data structure that defines second relationships among pre-determined texts and pre-determined images. The method also includes returning a subset of images from the pre-determined images. The subset includes those images in the pre-determined images for which matches exist between the first relationships and the second relationships.

16 Claims, 7 Drawing Sheets

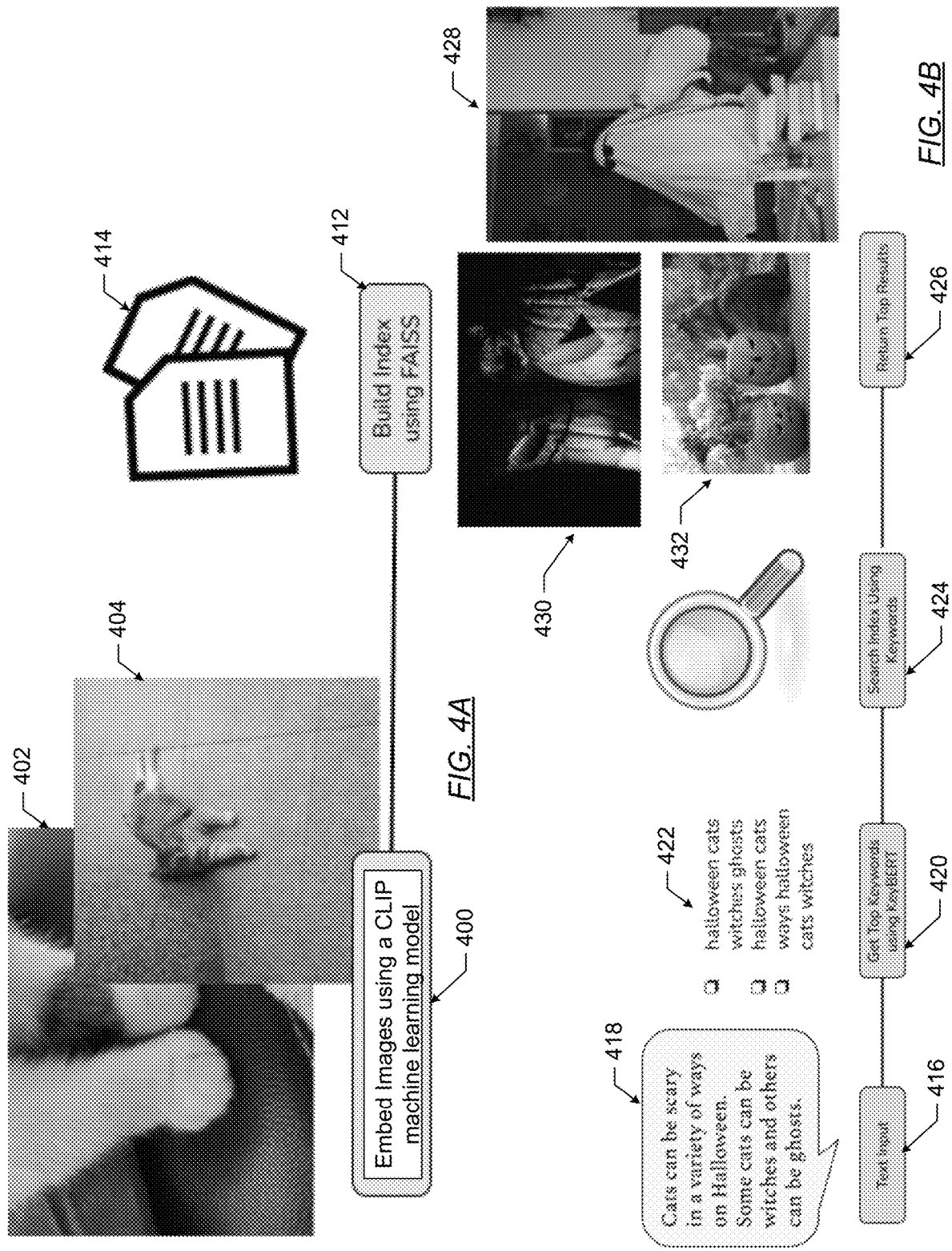

MACHINE LEARNING SELECTION OF IMAGES

BACKGROUND

Digital images are frequently used in many computing activities. In some cases, particularly when multiple disparate databases of images are accessible, thousands, millions, or more digital images may be available for selection. However, due to the large number of digital images, manually searching for and finding a particular digital image or type of digital image in the database(s) is impractical or impossible. Thus, improvements are sought for the automatic search and selection of digital images.

SUMMARY

The one or more embodiments provide for a method. The method includes receiving an input. The method also includes embedding the input into a first data structure that defines first relationships among images and texts. The method also includes comparing the first data structure to an index including a second data structure that defines second relationships among pre-determined texts and pre-determined images. The method also includes returning a subset of images from the pre-determined images. The subset includes those images in the pre-determined images for which matches exist between the first relationships and the second relationships.

The one or more embodiments provide for another method. The method includes inputting, to an image processing machine learning model, images. The method also includes outputting, by the image processing machine learning model, an image vector that represents the images. The method also includes building an index from the image vector. Building includes inputting the image vector to a nearest neighbor machine learning model. Building also includes outputting, by the nearest neighbor machine learning model, the index. The method also includes returning the index.

The one or more embodiments also provide for a system. The system includes a processor and a data repository in communication with the processor. The data repository stores an input including both images and texts. The data repository also stores a first data structure that embeds the input. The first data structure defines first relationships among the images and the texts. The data repository also stores an index including a second data structure that defines second relationships among pre-determined texts and pre-determined images. The data repository also stores a subset of images. The subset includes those images in the pre-determined images for which matches exist between the first relationships and the second relationships. The system also includes a server controller which, when executed by the processor, embed the input into the first data structure; compares the first data structure to the second data structure; and returns the subset of images from the pre-determined images.

Other aspects will be apparent from the following description and the appended claims.

BRIEF DESCRIPTION OF DRAWINGS

FIG. 4A, FIG. 4B, and FIG. 4C show specific examples of the computing system of FIG. 1A and FIG. 1B, and the methods of FIG. 2 and FIG. 3, in accordance with one or more embodiments.

Like elements in the various figures are denoted by like reference numerals for consistency.

DETAILED DESCRIPTION

Figure 1A:
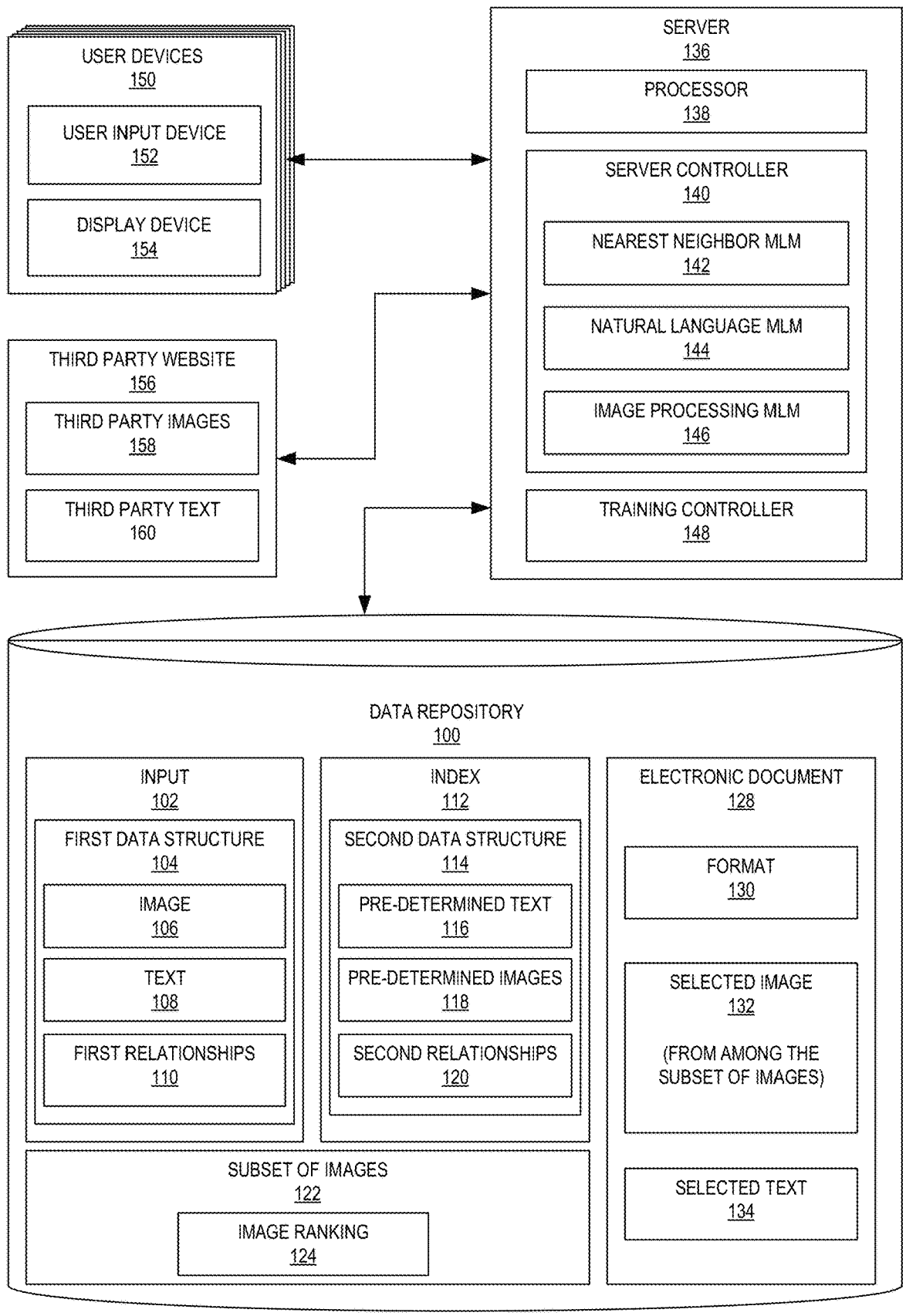
FIG. 1A shows a computing system, in accordance with one or more embodiments.

In general, embodiments are directed to methods for using machine learning to select desired images from among a large pool of available images. The one or more embodiments may be particularly useful, for example, with respect to the automatic generation of emails which contain images that are relevant to the textual content of the email.

A technical problem arises when the pool of available images is large, e.g., on the order of millions of stock images. Current machine learning techniques use an undesirable amount of time to identify relevant images when starting from a large pool of images (e.g., ten seconds or longer, which some users may not tolerate).

Furthermore, the accuracy of current machine learning image searches may be reduced when a large pool of available images is processed. For example, using a Contrastive Language-Image Pre-training (CLIP) machine learning model, without more, is too generic to identify relevant images or to narrow the number of potentially relevant images to a number manageable for a user. For example, if the content does not align with the literal meaning of text, then the CLIP machine learning model may not identify relevant images or sufficiently narrow the number of potentially relevant images. In a specific example, assume that the term "big year end sale" is associated with an image of a clock, or an image of an hourglass about to run out of sand. The literal meaning of the text does not align with the image, so a generic CLIP machine learning model may not be able to output relevant images.

Thus, in summary, the technical problem is to search through a large pool of images (e.g., millions of images or more) and identify relevant images within a short time period (e.g. a few seconds or less). Briefly, the one or more embodiments solve the above-identified technical problem by using multiple machine learning models to 1) build a context-specific index, 2) identify keywords in available text and 3) compare embedded versions of the keywords and/or input images to the index. Stated differently, the one or more embodiments use a topic extraction machine learning model executing on available input text or images (or both), which then feed into the search index in order to return results from the pool of images.

The one or more embodiments return relevant images more quickly than pre-existing image search algorithms. In particular, because the index is pre-built for the existing pool, and further may be tailored to a specific user, images may be searched and identified more quickly and accurately. Specifically, rather than searching through the pool images, a comparison is made between the index and the embedded version of the keywords and/or images specified for the query. Thus, the amount of data that is to be searched may be reduced by using a nearest algorithm, such as a k-nearest neighbor machine learning model. Further, the type of data processing being performed (e.g., the comparison of matrices, rather than the direct comparison of images by a single machine learning model) is easier and faster for a computer to process. Thus, the image identification method of the one or more embodiments is both significantly faster and more accurate than using the direct approach using a single machine learning model to identify images in a pool of images.

Images returned by the one or more embodiments may be returned by a number of different methods. Returned images may be ranked and then displayed to the user, for user selection. Returned images may be automatically placed in documents, such as emails. Other examples are provided below.

Specific details regarding the arrangement and use of the machine learning models is shown in FIG. 1A through FIG. 3. A specific example is shown in FIG. 4A through FIG. 4C.

Attention is now turned to the figures. FIG. 1A shows a computing system with which the one or more embodiments may be implemented. The computing system shown in FIG. 1A includes a variety of components, as described below.

In one or more embodiments, the data repository (100) is a storage unit and/or device (e.g., a file system, database, data structure, or any other storage mechanism) for storing data. The data repository (100) may include multiple different, potentially heterogeneous, storage units and/or devices.

The data repository (100) stores an input (102). The input (102) is data in the form of a data structure that serves as input to one or more machine learning models. In particular, the 102 is one or more images, one or more texts, or both, that will be used to select images of interest using an index, as explained with respect to FIG. 2.

The input (102) may take the form of a first data structure (104). The first data structure (104) is a vector. A vector is a type of data structure that a machine learning model may take as input when a processor executes the machine learning model. A vector may take form of a matrix, such as but not limited to a 1×N (i.e., one-dimensional) matrix where each value of the matrix represents the value of a specific feature within a total of "N" features. A feature is a type of information of interest, such as a pre-specified type of image, or an indication of whether a particular object is included in an image. In this example, if the value of the feature is "1," then the associated image is of the pre-specified type or contains the particular object. If the value of the feature is "0," then the associated images is not of the pre-specified type or does not contain the particular object. Many different types of features are possible.

The input may be related to one or more images, one or more texts, or both. Thus, the first data structure (104) may include features which describe the one or more images, the one or more texts, or both. In an embodiment, the process of converting an image or an instance of text into the first data structure (104) may be referred-to as "embedding." Thus, because the first data structure (104) describes the input (102) in a format which a machine learning model can use, it can be said that the machine learning model embeds the input (102).

For the sake of convenient reference, the one or more embodiments refers to the first data structure (104) as containing information which describe an image (106) and a text (108). The image (106) is a digital image that represents at least a portion of the input (102). The text (108) is one or more keywords (including a phrase) that represent at least a portion of the input (102). The image (106), the text (108), or both, may be represented as a vector, as described above with respect to the first data structure (104).

While reference to one image is made (e.g., the image (106)), the one or more embodiments contemplate that the first data structure (104) may contain features describing many different images. Likewise, while reference to one instance of text is made (e.g., the text (108)), the one or more embodiments contemplate that the first data structure (104) may contain features describing many different instances of text. Note that the term "first" is a nonce word used to distinguish the first data structure (104) from a second data structure (114) described further below. Likewise, the term "second" is a nonce term used to distinguish the first data structure (104) from the second data structure (114). While the first data structure (104) and the second data structure (114) are different and distinct, they have similar structures, again as described below.

The first data structure (104) also describes first relationships (110) among the image (106) and the text (108). The first relationships (110) take the form of data that describes how the image (106) and the text (108) are related. The data that defines the first relationships (110) may be implicit in the structure of the first data structure (104) itself.

For example, the first data structure (104) may be an M by N matrix, where each instance of text is a feature that is described by rows of the matrix, and each instance of an image is a feature that is described by columns of the matrix. Thus, each cell in the matrix is a pair of values, such as "I," representing the value of the corresponding image feature, and "T," representing the value of the corresponding text feature. In this specific example, the relationship between I and T in the cell is not defined explicitly. However, because every image feature in the matrix is associated with every text feature in the matrix, the matrix can still be used to identify the relationships of texts to images when compared to another matrix that also relates texts to images. An example of this process is shown in FIG. 4A through FIG. 4C.

Nevertheless, it is possible that the explicit relationship between a given image and a given text is stored in the first data structure (104). For example, each cell of the M by N matrix described above may include a third entry describing a degree of match. In yet another alternative, the matrix may be a M by N by O matrix, where the third dimension of "O" values define the relationships between the images in row M and the texts in column N. There are other techniques, implicit or explicit, for quantifying the first relationships (110) between the images and text of the first data structure (104).

The data repository (100) also store an index (112). The index (112) is similar to the input (102), in that the index (112) is a second data structure (114) that defines the relationships between pre-determined text (116) and pre-determined images (118). The second data structure (114) may have a similar structure as the first data structure (104). For example, while the dimensionality (e.g., a 2×2 matrix has a dimension of 2 and a 3×3 matrix has a dimension of 3) of the first data structure (104) and the second data structure (114) may be different, both may be matrixes which store information that relates images to text.

However, a difference between the first data structure (104) and the second data structure (114) is the specific information stored. In particular, with respect to the index (112), the pre-determined text (116) has known relationships to the pre-determined images (118). In other words, each pre-determined image in the pre-determined images (118) is related to one or more instances of pre-determined text (118) that describes the corresponding pre-determined image (118). More specifically, the index (118) stores the embeddings of the pre-determined images and the pre-determined text (118).

In an example, the pre-determined images (118) may be the pool of images described above. Stated differently, the pre-determined image (118) a million pre-determined images, a few of which may be of interest to a user. The method of FIG. 2 may be used to identify which of the million pre-determined images should be returned to the user.

The second data structure (114) also stores second relationships (120) between the pre-determined text (116) and the pre-determined images (118). The second relationships (120) define implicit or explicit relationships between the pre-determined text (116) and the pre-determined images (118). Thus, the second relationships (120) may be similar in nature to the first relationships (110).

Figure 2:
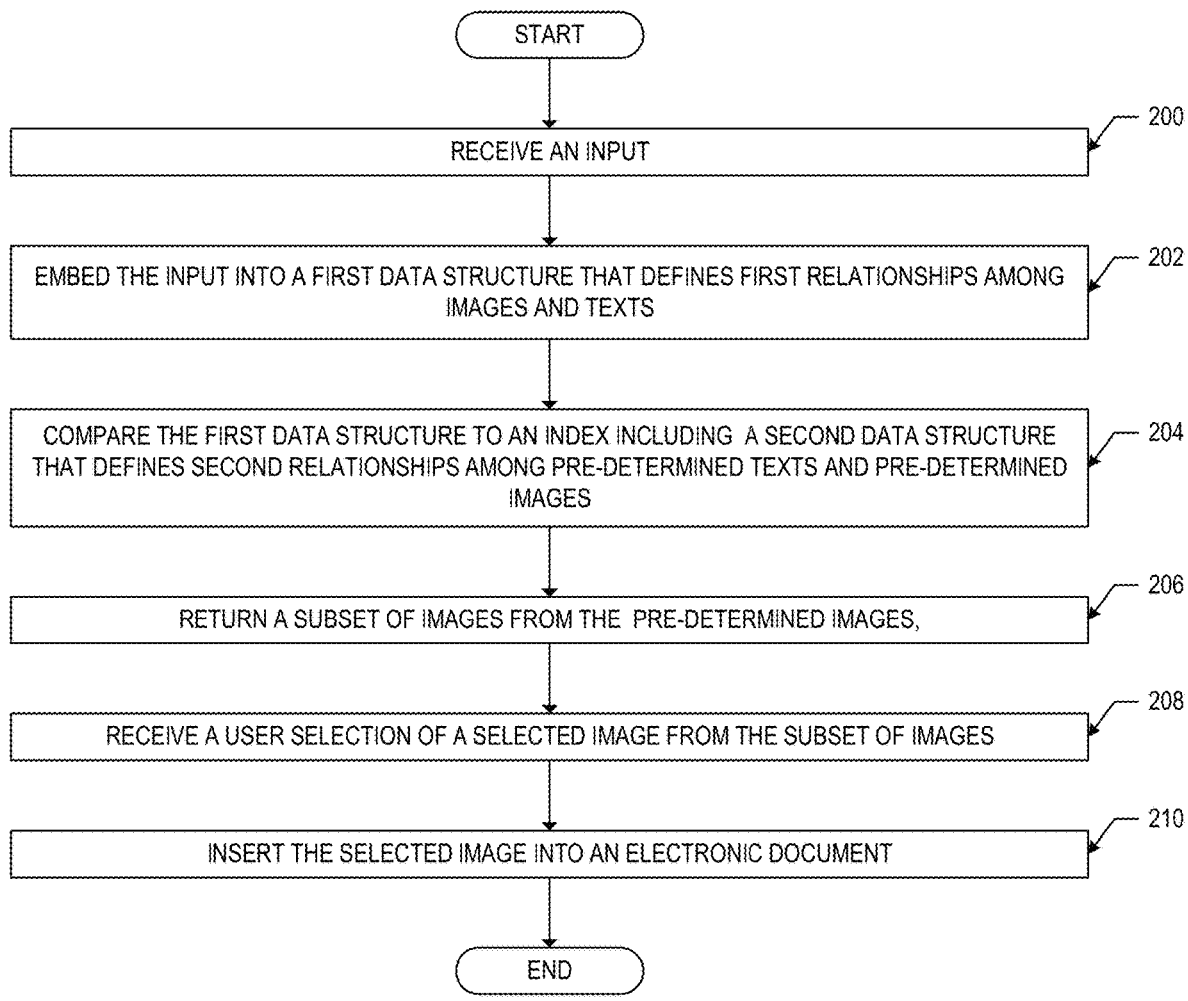
FIG. 2 and FIG. 3 show flowcharts of methods, in accordance with one or more embodiments.

Use of the index (112) is described with respect to FIG. 2. Generation of the index (112) is described with respect to FIG. 3

The data repository (100) also stores a subset of images (122). The subset of images (122) is one or more images returned from the pre-determined images (118). In an example, the subset of images (122) is those images from the pre-determined images (118) that are of interest to the user. The subset of images (122) may be those images in the pre-determined images (118) for which matches exist between the first relationships (110) and the second relationships (120), as described with respect to FIG. 2.

The subset of images (122) may be organized by an image ranking (124). The image ranking (124) is a predicted value that represents the predicted relevance of a returned image to the user. In an example, the subset of images (122) may be organized by the image ranking (124), from highest predicted relevance to lowest predicted relevance. The image ranking (124) may be determined by the output of a machine learning model, as described with respect to FIG. 2 and FIG. 3.

The data repository (100) also may store an electronic document (128). The electronic document (128) is a data file which a computer processor may use to generate a graphical user interface. The electronic document (128) may be an email, a word processing document, a portable document file (PDF), a presentation document, an image manipulation document, etc.

The electronic document (128) may have a format (130). The format (130) is data or metadata that defines how text, images, or other document elements are arranged when the electronic document (128) is displayed on a display device.

The electronic document (128) may include a selected image (132). The selected image (132) is one of the images from the pre-determined image (118). The selected image (132), specifically, is an image selected for inclusion in the electronic document (128). Selection of the image is described with respect to FIG. 2.

The electronic document (128) also may include selected text (134). The selected text (134) is text selected for inclusion in the electronic document (128). Selection of the selected text (134) is described with respect to FIG. 2.

The system shown in FIG. 1A may include other components. For example, the system may include a server (136). The server (136) is one or more computers, possibly operating in a distributed computing environment. An example of the server (136) is described with respect to FIG. 5A.

The server (136) may include a processor (138). The processor (138) is one or more hardware processors or virtual processors, possibly operating in a distributed computing environment. An example of the processor (138) is described with respect to FIG. 5A.

The server (136) also may include a server controller (140). The server controller (140) is computer readable code or application specific hardware which, when executed, controls the execution of one or more instances of computer readable program code. Thus, the server controller (140) may be computer readable program code which, when execute, performs the method of FIG. 2, the method of FIG. 3, the examples of FIG. 4A through FIG. 4C, or a combination thereof.

The server controller (140) may control the execution of one or more machine learning models. A machine learning model (MLM) is a computer program that has been trained to recognize certain types of patterns. Training involves establishing parameters of the MLM using a set of training data for which the output pattern is already known. Once the parameters are set, the MLM may be provided with new data for which the output pattern is not known. The output of the trained MLM operating on new data is one or more numbers that reflect a prediction of the types of patterns in the new data.

The server controller (140) may include a nearest neighbor MLM (142). The nearest neighbor MLM (142) is a supervised classification machine learning model. A nearest neighbor classifies an unlabeled example in two steps. First, the nearest neighbor MLM (142) sorts labeled examples from the training set based on their nearness to the given unlabeled example. The term "near" refers to the numerical difference between a training set and the unlabeled example. Second, the nearest neighbor MLM (142) identifies the majority label among top nearest neighbors. The majority label is the prediction. This means, the unlabeled instance is assigned to the class that has the most representative examples amongst those that are closest to the given unlabeled example. An example of the nearest neighbor MLM (142) is a k nearest neighbor machine learning model. Another example of the nearest neighbor MLM (142) is a FACEBOOK® Artificial Intelligence Similarity Search (FAISS) similarity search machine learning model.

The nearest neighbor MLM (142) when executed by the processor, takes as input the embeddings of the pre-determined texts (116) and the pre-determined images (118). Again, an embedding is a vector representation of data. The nearest neighbor MLM (142) generates the index (112) as output. The process of generating the index (112) is described with respect to FIG. 3.

The server controller (140) also includes a natural language MLM (144). The natural language MLM (144), when executed, is programmed to analyze language, such as parts of speech, entities, sentiment, and other aspects of text. The natural language MLM (144) is a supervised or an unsupervised machine learning model. Examples of the natural language MLM (144) include, but are not limited to, support vector machines, Bayesian networks, maximum entropy models, conditional random field models, and neural networks.

In the one or more embodiments, the natural language MLM (144) takes the input (102) and generates the text (108) as output. Again, the text (108) may be keywords, as described above. In other words, a corpus of text may serve as input to the second data structure (114), which predicts which words in the corpus of text are keywords that represent the semantic meaning of the corpus of text.

The server controller (140) also includes the image processing MLM (146). The image processing MLM (146), when executed, is programmed to analyze images for patterns, classification, segmentation, and other image-related functions. For example, the image processing MLM (146) may recognize patterns in an image in order to classify the presence of a certain type of object in the image. In another example, the image processing MLM (146) may classify the image, such as in the case of facial recognition machine learning models. In still another example, the image processing MLM (146) may embed an image as a vector. Examples of the image processing MLM (146) include, but are not limited to, OpenCV, Tensorflow, PyTorch, and others.

In the one or more embodiments, the image processing MLM (146), when executed, takes the input (102) and generates the image (106) as output. In other words, the image processing MLM (146) may take, as input, one or more images. The output of the image processing MLM (146) is a vector that may be the first data structure (104) or part of the first data structure (104) (and specifically the image (106) within the first data structure (104)).

Figure 1B:
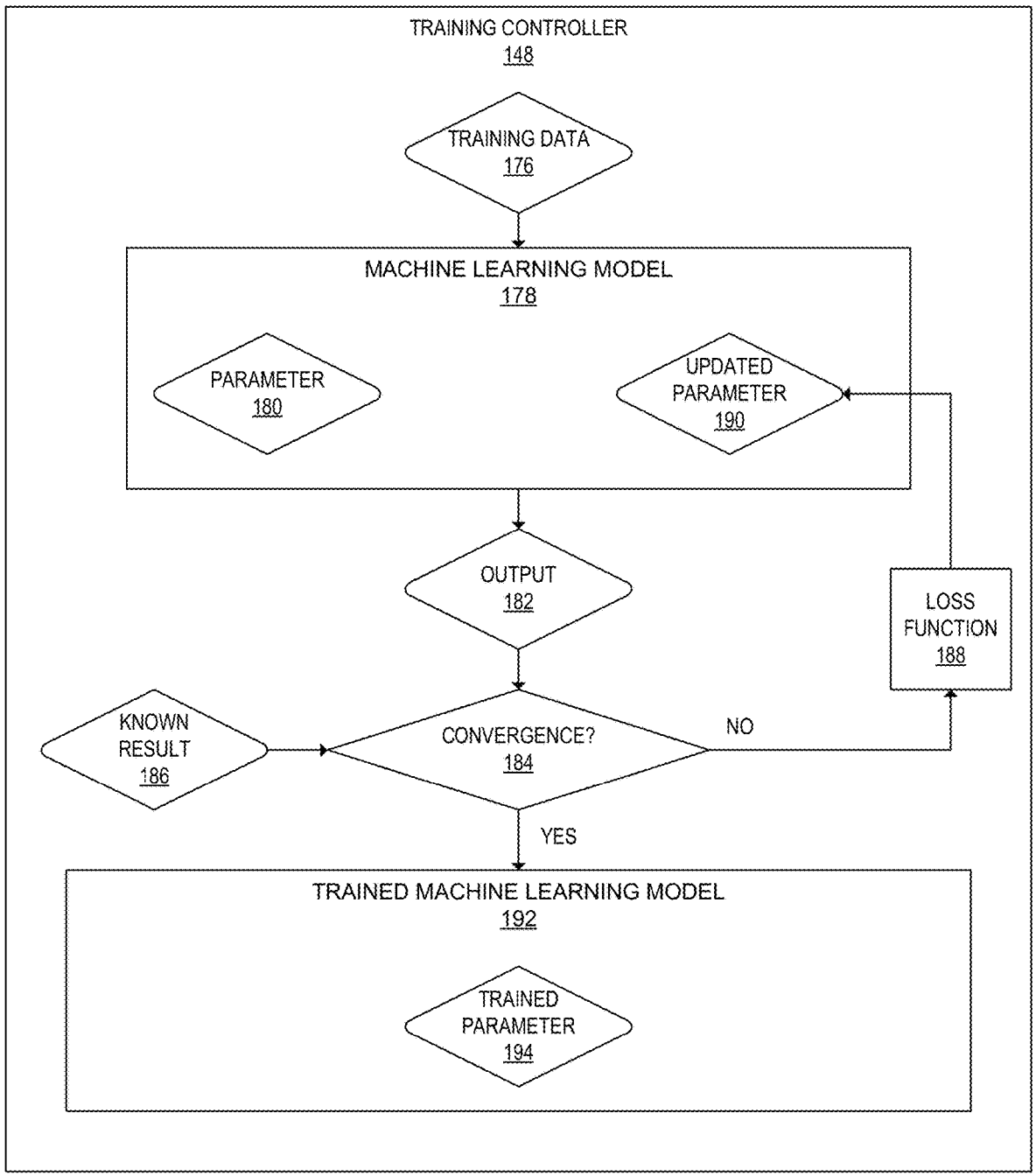
FIG. 1B shows details of the training controller shown in FIG. 1A, in accordance with one or more embodiments.

The server (136) also may include a training controller (148). The training controller (148) is computer readable code or application specific hardware which, when executed, trains one or more of the MLMs executable by the server controller (140). Details of the training controller (148) are shown in FIG. 1B.

The system of FIG. 1A may include, or interact with, still other components. For example, the system of FIG. 1A may include one or more user devices (150). The user devices (150) are computers remote from the server (136). In some embodiments, the user devices (150) are not part of the system shown in FIG. 1A, but rather are accessed by the server (136) For example, the user devices (150) may be third-party computing systems which access the server, or which are accessed by the server during the methods shown in FIG. 2 or FIG. 3.

The user devices (150) include a user input device (152). The user input device (152) is a device a user may use to provide input to the user devices (150). Examples of the user input device (152) include, but are not limited to, a keyboard, a mouse, a touchscreen, and a microphone.

The user devices (150) also may include a display device (154). The display device (154) is a projector, screen, monitor, television, or other device on which a graphical user interface may be displayed.

The system shown in FIG. 1A also may include a third party website (156). The third party website (156) may be hosted by one of the user devices (150), or by another server distinct from and not under the control of the server (136). The third party website (156) may be associated with a user, but also may be associated with parties unaffiliated with the execution of the method of FIG. 2 or FIG. 3.

The third party website (156) may include third party images (158). The third party images (158) are images generated or used by parties other than the entity which operates the server (136) or the data repository (100). The third party images (158) may be images which a user selects, controls, or accesses (e.g., images from the user's website). The third party images (158) may form part of the input (102). The third party images (158) also may be included, or added to, the predetermined image (118).

Similarly, the third party website (156) may include third party text (160). The third party text (160) is text generated or used by parties other than the entity which operates the server (136) or the data repository (100). The third party text (160) may be text which a user selects, controls, or accesses (e.g., text from the user's website). The third party text (160) may form part of the input (102). The third party text (160) also may be included, or added to, the pre-determined text (116).

Attention is turned to FIG. 1B, which shows the details of the training controller (148). The training controller (148) is a training algorithm, implemented as software or application specific hardware, that may be used to train one or more the machine learning models described with respect to FIG. 1A, including the nearest neighbor MLM (142), the natural language MLM (144), and the image processing MLM (146).

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model (i.e., the trained machine learning model (192)) is applied to the unknown input in order to make predictions. Examples of the unknown input may be the first data structure (104), the third party images (158), the third party text (160), and other sources of input of FIG. 1A.

In more detail, training starts with training data (176). The training data (176) is data for which the final result is known with certainty. For example, if the machine learning task is to predict keywords in a corpus of text (i.e., the output of the natural language MLM (144)), then the training data (176) may be one or more corpuses of text for which the keywords are already known.

The training data (176) is provided as input to the machine learning model (178). The machine learning model (178), as described before, is an algorithm. However, the output of the algorithm may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is a output (182), which is a prediction, a classification, a value, or some other output which the machine learning model (178) has been programmed to output.

The output (182) is provided to a convergence process (184). The convergence process (184) compares the output (182) to a known result (186). A determination is made whether the output (182) matches the known result (186) to a pre-determined degree. The pre-determined degree may be an exact match, a match to within a pre-specified percentage, or some other metric for evaluating how closely the output (182) matches the known result (186). Convergence occurs when the known result (186) matches the output (182) to within the pre-determined degree.

If convergence has not occurred (a "no" at the convergence process (184)), then a loss function (188) is generated. The loss function (188) is a program which adjusts the parameter (180) in order to generate an updated parameter (190). The basis for performing the adjustment is defined by the program that makes up the loss function (188), but may be a scheme which attempts to guess how the parameter (180) may be changed so that the next execution of the machine learning model (178) using the training data (176)

with the updated parameter (190) will have an output (182) that more closely matches the known result (186).

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194).

During deployment, the trained machine learning model (192) with the trained parameter (194) is executed again, but this time on the input described above (e.g., the first data structure (104), the third party images (158), the third party text (160), etc. of FIG. 1A) for which the final result is not known. The output of the trained machine learning model (192) is then treated as a prediction of the information of interest relative to the unknown data.

An example of operation of the training controller (148) is now provided. In the following example, a Contrastive Language-Image Pre-training (CLIP) machine learning model is trained.

The training controller (148) receives a set of emails containing raw images and associated raw text. Not all raw images need have associated raw text. Some instances of the raw images may include multiple instances of associated raw text. Thus, each raw image is associated with zero or more instances of raw text. However, each raw image that will be used will be associated with at least one text instance. Thus, an added text may be associated with a raw image for those raw images without raw text. The raw images and the associated raw text, possibly modified with such added text, together form training data.

During training, a training portion of the training data may be extracted, and a remaining portion of the training data may be retained. The training portion is used to train the CLIP model. The remaining portion, for which output labels are known, is retained in order to test the operation of machine learning model. Thus, the test portion includes a subset of the raw images and the associated raw text. After extracting, the remaining portion of raw images and associated raw text forms another subset of the raw images and the associated raw text.

Prior to training, the training controller may label data by labeling the raw images as being associated with the associated raw text. Labeling the data may be optional if the labeling had already been performed. Labeling the data generates labeled data.

Then, the labeled data is embedded into a known vector. Embedding may be performed by transforming the data in the original format in which it was extracted into a vector.

Finally, the CLIP machine learning model is trained using the remaining portion as input and the known vector as the known result. For example, as shown in FIG. 1B, the remaining portion is the "training data (176)" which is input to the machine learning model (178). The machine learning model (178) generates a prediction in the form of the output (182). The output (182) is compared to the known result (186), which in this example is the known vector. If convergence (184) has not occurred, then the difference between the output (182) and the known result (186) is used to generate a loss function (188). The loss function is used to update the machine learning model (178). The process continues until convergence is achieved, at which point the CLIP machine learning model is considered a trained machine learning model (192).

While FIG. 1A and FIG. 1B show a configuration of components, other configurations may be used without departing from the scope. For example, various components may be combined to create a single component. As another example, the functionality performed by a single component may be performed by two or more components.

Figure 3:
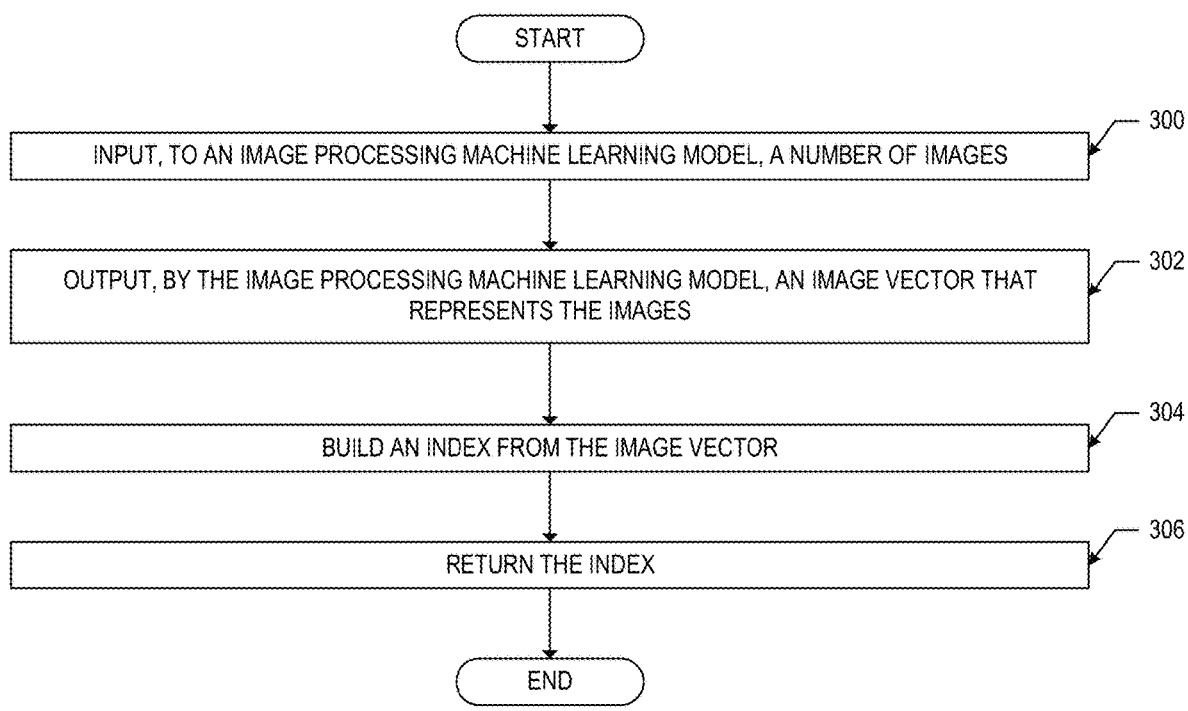
Figure 4C:
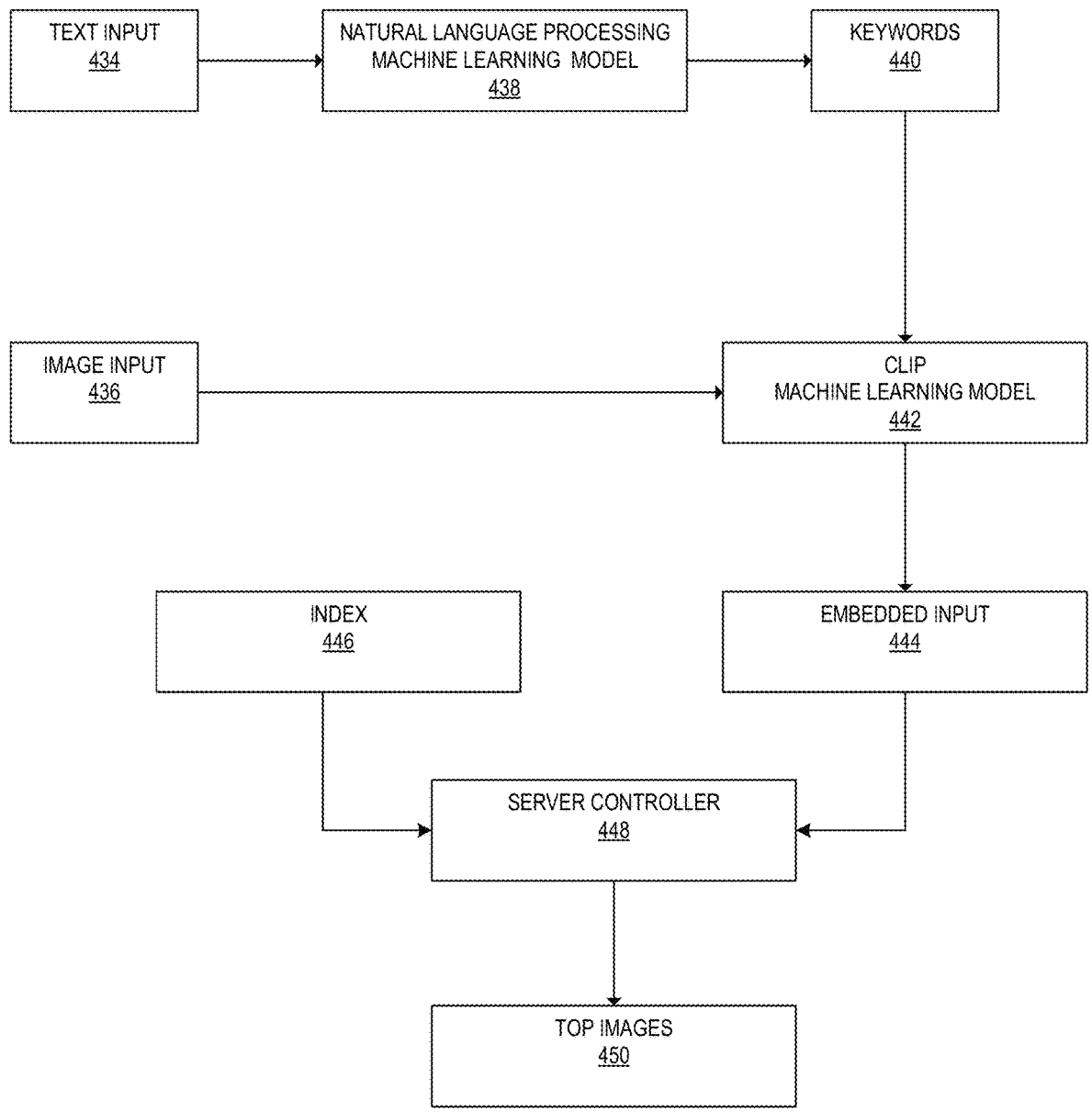

FIG. 2 and FIG. 3 show methods of machine learning selection of images, according to the one or more embodiments. The methods of FIG. 2 and FIG. 3 may be implemented using the system shown in FIG. 1A and FIG. 1B. The methods of FIG. 2 and FIG. 3 may be executed using a computing system, such as that shown in FIG. 5A and FIG. 5B.

Attention is first turned to FIG. 2. FIG. 2 may be characterized as a method for identifying specific images of interest from among many different images. The method of FIG. 2 also may be characterized a method of machine learning selection of images.

Step 200 includes receiving an input. The input may be received in the form of text, images, or both. The input may be received by user selection of images or text, such as when the user seeks to find additional images that are related to images or text.

The input may be received automatically. For example, a website may be scraped to generate the text, the image, or text associated with an image. In another example, an email may be input to a natural language machine learning model. The output of the natural language machine learning model is at least one keyword that represents the subject or sentiment of the email.

Step 202 includes embedding the input into a first data structure that defines first relationships among images and texts. As described above, embedding is the process of converting one form of data into a vector suitable for use as input to a machine learning model. Embedding the input into the first data structure may be accomplished by a number of different methods, possibly depending on the type of the input data.

For example, when the input is text, the input may be embedded by entering one or more values in a vector for a feature that corresponds to the text. In another example, when the input is an image, the input may be embedded by means of an image processing machine learning model.

The resulting first data structure may define the relationships among images and the text in the manner described above with respect to FIG. 1. For example, the images may be represented by features and the text associated by features, creating implicit or explicit relationships among the text and images.

Step 204 includes comparing the first data structure to an index including a second data structure that defines second relationships among pre-determined texts and pre-determined images. The first and second data structures may be compared by a number of different techniques.

For example, the embedding of the image and/or the embedding of the text is input to the nearest neighbor machine learning model (142). The metric used by the nearest neighbor machine learning model (142) may be the cosine function. Image features may encoded by a vision portion of the CLIP model. The CLIP model may return text features encoded by a language portion of the CLIP model.

Step 206 includes returning a subset of images from the pre-determined images. As described above, the subset of images are those images in the pre-determined images for which matches exist between the first relationships and the second relationships.

Returning the subset of images may be performed by a variety of different methods, depending on a preferred output of the method for machine learning selection of images. For example, the subset of images may be returned by transmitting the subset of images to a remote user device. An example of this type of returning of the subset is shown in FIG. 4A through FIG. 4C.

In another example, the subset of images may be returned by displaying the subset of images on a display device of a remote user device. Again, an example of displaying images on a remote user device is shown in FIG. 4A through FIG. 4C.

In yet another example, the subset of images may be returned by storing the identities of the returned images (e.g., returning an identifier number associated with a corresponding pre-determined image in the set of pre-determined images). The stored identities of the returned images then may be used in further automatic processing. For example, the returned images may be embedded (i.e., converted into a vector by an image processing machine learning model) and then used to classify the returned image, search for other images in a different database of images, etc. Other examples of returning the subset of images is possible.

In an embodiment, the method of FIG. 2 may terminate after step 206. However, the method may also be continued. For example, step 208 includes receiving a user selection of a selected image from the subset of images. In this case, the subset of images is displayed on a display device of a user device. The user may use an input device of the user device to select one of the images presented to the user. The selection of the image is transmitted to the server controller, or is used for some other process on the user device, or both.

Step 210 then includes inserting the selected image into an electronic document. The electronic document may be inserted by the server controller, by the local user device, or some combination thereof. The file associated with the selected image may be added to, or referenced in, the electronic document. Thus, for example, the selected image may be added automatically to an email document being generated by the local user device or the server controller. In one embodiment, the method of FIG. 2 may terminate thereafter.

The method of FIG. 2 may be varied. More or fewer steps may be present, or some of the steps may be modified. In an example, the method of FIG. 2 also may include ranking the subset of images according to a ranking criterion. The ranking criterion may be the degree of relevance or match predicted between the first data structure and the second data structure. In this case, a ranked subset of images may be returned to the user in order to show those pre-determined images predicted to be most likely to be similar to the input. Still other variations are possible.

Attention is now turned to FIG. 3. FIG. 3 is a method for building the index model that is used at runtime, as described with respect to FIG. 2.

Step 300 includes inputting, to an image processing machine learning model, a number of images. The images may be the pre-determined images described above. The images may be retrieved from local or remote databases, scraped from websites, retrieved from documents, etc. The images may be stored as one or more data files used for storing image data (.jpg, .png, etc.). The images may be converted to a specific data format and then input to the image processing machine learning model.

Step 302 includes outputting, by the image processing machine learning model, an image vector that represents the images. The image vector is stored for later use in step 304.

Step 304 includes building an index from the image vector. The process of building the index includes inputting the image vector to a nearest neighbor machine learning model. The nearest neighbor model indexes the image embeddings (i.e., the image vector) so that the images may be searched more easily. The function of the nearest neighbor machine learning model is to act as a search algorithm so that relevant results of images may be returned quickly, relative to other search techniques. Thus, the output of the execution of the nearest neighbor machine learning model is the index.

Step 306 includes returning the index. The index may be returned by storing the index for future use, such as during the method of FIG. 2 as described above. The index also may be returned by providing the index to some other automated process. In one embodiment, the method of FIG. 3 may terminate thereafter.

The method of FIG. 3 may be varied by adding steps, removing steps, or modifying steps. For example, the method of FIG. 3 may be extended by receiving an input, which may be an image, text, or both. The input may be scraped from a website of a third party.

In this case, the method also includes using the index. Using the index includes converting a raw input to a first data structure that defines relationships among input images and input texts. The resulting data structure is compared to the index. Then, a subset of the images is returned. The subset is those images of the images that correspond to first entries in the index which satisfy a matching criterion when compared to second entries in the index, as described above.

While the various steps in the flowcharts of FIG. 2 and FIG. 3 are presented and described sequentially, at least some of the steps may be executed in different orders, may be combined or omitted, and at least some of the steps may be executed in parallel. Furthermore, the steps may be performed actively or passively.

FIG. 4A through FIG. 4C show an example of machine learning selection of images, according to the one or more embodiments. The following example is for explanatory purposes only and not intended to limit the scope of the one or more embodiments.

FIG. 4A shows a pictorial representation of building the index. As shown at step (400), image (402) and image (404) are embedded into a vector format using a CLIP machine learning model. At step (412) a FACEBOOK® Artificial Intelligence Similarity Search (FAISS) similarity search machine learning model takes the embedded images as input. The output of the FAISS machine learning model is an index (414). The index (414) is a data structure as described above with respect to FIG. 1.

FIG. 4B shows a specific, exemplary use case of the index (414). The text input (416) is shown in comment box (418). The comment box (418) states as follows: "Cats can be scary in a variety of ways on Halloween. Some cats can be witches and others can be ghosts." The text input (416) is the corpus. The corpus is provided as input to a KeyBERT natural language processing (NLP) machine learning model at step (420). The output of the NLP machine learning model is a series of keywords (422), including "Halloween cats witches ghosts", "Halloween cats," and "ways Halloween cats witches."

Note that in this example, text alone is the input. However, the input may be both text and images, as shown in FIG. 4C.

Step 420 also includes embedding the keywords using a CLIP machine learning model. The output of the CLIP machine learning model is a vector which may be compared to the index (414) shown in FIG. 4A.

Next, at step (424), a search is performed of the index (414) using the embedded version of the keywords (422) obtained at step (420). The search identifies those images in the pre-determined images (of which image (402) and image (404) were only two) which are related to the keywords (422).

The output (426) of the search at step (424) is the top results. In the example, output image A (428) shows a person pretending to be a ghost by wearing a sheet, with a cat standing nearby. Output image B (430) shows two jack-o-lanterns with a cat sitting atop one of the jack-o-lanterns. Output image C (432) shows two other jack-o-lanterns with a cat standing to one side. As can be seen, each of the output images appears to relate both to the Halloween holiday and cats. The user may then select one or more of the images for use, such as to insert the selected image or images into an email template for use in generating emails.

Due to the number of images in the pre-determined image pool, it would have been impractical or impossible for the user to have searched through all of the images to find the three output images shown. However, using the one or more embodiments the user may input text, and in turn the user will rapidly see a selection of images from the pre-determined image pool that are relevant to the input text.

FIG. 4C shows another example of the one or more embodiments. In particular, FIG. 4C illustrates that the one or more embodiments may be used with multiple input types. In the example of FIG. 4C, the user owns a business and a website. The website describes the user's business and allows the user's customers to conduct electronic commerce at the website. The user, in the example, seeks to find pictures relevant to his business from among a large pool of pre-determined stock images. The user intends to insert the images into an email template that the user will send to targeted customers.

Thus, the input includes both text input (434) and image input (436). The text input (434) is text automatically scraped from the user's website. The image input (436) is also scraped from the user's website by capturing image files of images on the website.

The text input (434) is provided as input to a natural language machine learning model (438). The output of the natural language machine learning model (438) is keywords (440).

The image input (436) and the keywords (440) are fed as input to a CLIP machine learning model (442). The CLIP machine learning model generates, as output, an embedded input (444). The embedded input (444) is a vector representation of the combined input of the image input (436) and the keywords (440). The CLIP machine learning model (442) effectively embeds both the keywords (440) and the image input (436) into a single data representation space.

In FIG. 4C, it is assumed that the index (446) has already been built. The index (446) may be the index (414) described with respect to FIG. 4A or the index (112) of FIG. 1A.

Next, the index (446) and the embedded input (444) are compared. A server controller (448), or some other software, may be used to compare the index (446) to the embedded input (444). The server controller (448) may be the server controller (140) described with respect to FIG. 1A. The server controller (448) may compare the index (446) to the embedded input (444) using a number of methods. In this example, the index (446) and the embedded input (446) are compared using a K-nearest neighbor machine learning model (i.e., the server controller (448) executes a K-nearest neighbor machine learning model, which takes as input the index (446) and the embedded input (444)).

The output of the server controller (448) is a list of images, represented by the index (446), which match (within a threshold degree) the embedded input (444). In other words, the output of the server controller (448) are the identities of the top images (450) from the pool of available stock images. The identified stock images may then be retrieved and presented to the user. The top images (450) may be ranked, according to the degree of match between an entry in the embedded input (444) and the corresponding entry in the index (446), and presented in a ranked order.

After viewing the top images (450), the user selects one or more of the top images (450). The one or more selected images are automatically inserted into an email template.

Suggestions for automatically formatting the images, together with text supplied by the user, is suggested to the user. The suggestions may take the form of suggested sample email templates that include selected images and the text provided by the user. Each of the suggested sample emails represents a different formatting and arrangement of the selected images and the text.

The user selects one of the formatted email templates. The user may then use the selected formatted email template to generate one or more emails to be sent to targeted customers.

Note that the CLIP machine learning model (442) may be trained using a custom training data set from images that also have associated text. For example, past email advertising emails from a wide variety of different business may be consolidated into a raw training data pool. Each of the past advertising emails includes images and text. The text may be text in the email, or may be text contained in an image in an email. Text in an image may be identified using optical character recognition, or other techniques, and included in the corpus of raw text. The raw training data (text and associated images) may then serve as a labeled data set. The labeled data set may then be used to train the CLIP machine learning model. The process of training a machine learning model, including the CLIP machine learning model, is described with respect to FIG. 1B.

Figure 5A:
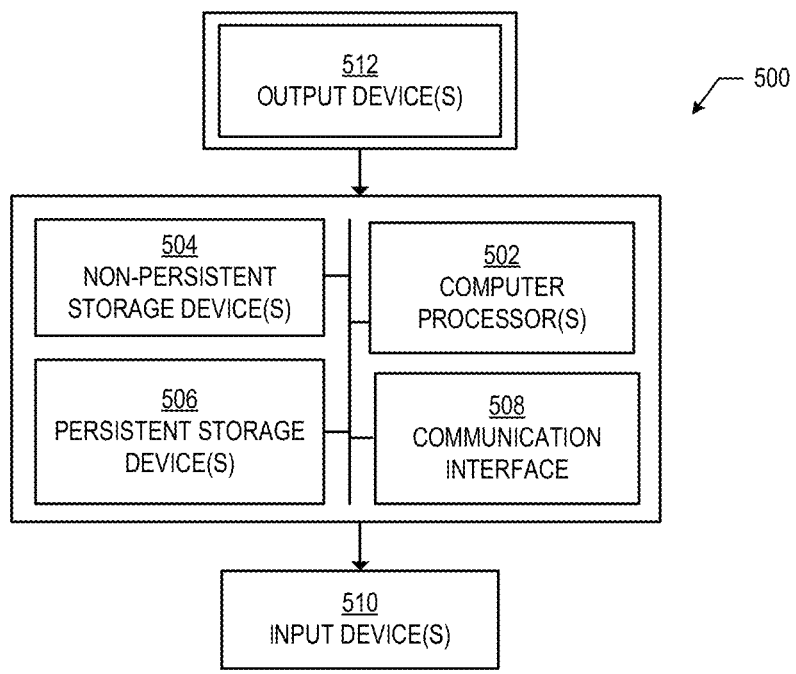
FIG. 5A and FIG. 5B show a computing system and network environment, in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (512). The inputs may include text input, audio input, video input, etc., which may be processed and transmitted by the computing system (500) in accordance with the disclosure. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
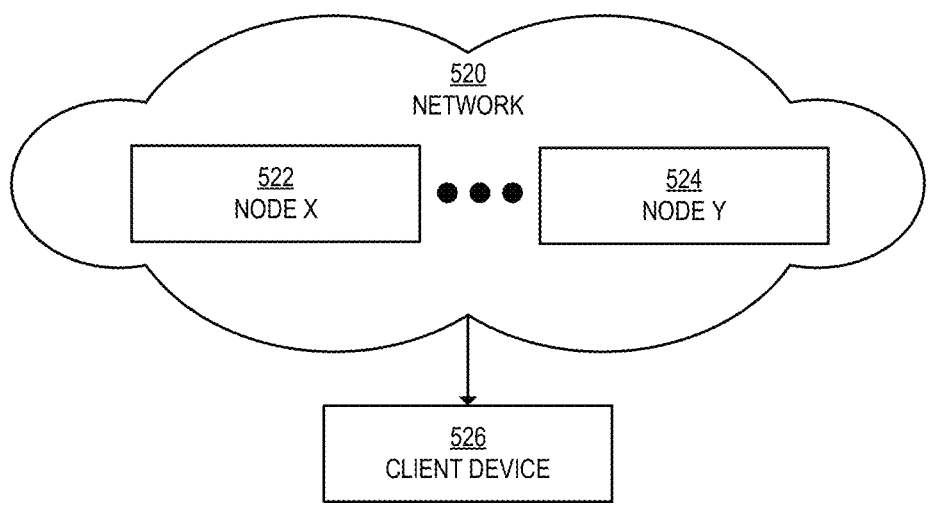

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   receiving an input comprising a plurality of texts from a source of text and a plurality of images from a source of images, wherein the plurality of texts is separate from the plurality of images;
   embedding the input into a first data structure that defines first relationships among the plurality of images from the source of images and the plurality of texts from the source of text;
   comparing the first data structure to an index comprising a second data structure that defines second relationships among a plurality of pre-determined texts and a plurality of pre-determined images, wherein:

the plurality of pre-determined texts have known relationships to the plurality of pre-determined images, each pre-determined image in the plurality of pre-determined images is related to one or more instances of the plurality of pre-determined texts, and the plurality of pre-determined texts is separate from the plurality of texts; and returning a subset of images from the plurality of pre-determined images, wherein the subset comprises those images in the plurality of pre-determined images for which matches exist between the first relationships and the second relationships.

2. The method of claim 1, further comprising:

receiving a user selection of a selected image from the subset of images; and inserting the selected image into an electronic document.

3. The method of claim 2, wherein the electronic document is selected from the group consisting of: an email document, a word processing document, a presentation building document, a portable document format (PDF) document, and an image manipulation document.

4. The method of claim 1, further comprising, prior to receiving the input:

scraping a website to generate a text associated with a scraped image; and generating the input from the text and the scraped image.

5. The method of claim 1, further comprising, prior to receiving the input:

inputting an email to a natural language processing machine learning model;

outputting, from the natural language processing machine learning model, at least one keyword; and generating the input from the at least one keyword.

6. The method of claim 1, wherein the input comprises at least one of a text and an image.

7. The method of claim 1, wherein comparing comprises performing a nearest neighbor comparison between the first data structure and the second data structure.

8. The method of claim 1, wherein returning the subset of images comprises:

transmitting the subset of images to a remote user device; and displaying the subset of images on a display device of the remote user device.

9. The method of claim 1, further comprising:

ranking the subset of images according to a ranking criterion.

10. A system comprising:

a processor;

a data repository, in communication with the processor, and storing:

an input comprising a plurality of texts from a source of text and a plurality of images from a source of images, wherein the plurality of texts is separate from the plurality of images;

a first data structure that embeds the input, wherein the first data structure defines first relationships among the plurality of images from the source of images and the plurality of texts from the source of text;

an index comprising a second data structure that defines second relationships among a plurality of pre-determined texts and a plurality of pre-determined images, wherein:

the plurality of pre-determined texts have known relationships to the plurality of pre-determined images, each pre-determined image in the plurality of pre-determined images is related to one or more instances of the plurality of pre-determined texts, and the plurality of pre-determined texts is separate from the plurality of texts, and a subset of images, wherein the subset comprises those images in the plurality of pre-determined images for which matches exist between the first relationships and the second relationships; and a server controller which, when executed by the processor:

embed the input into the first data structure;

compares the first data structure to the second data structure; and returns the subset of images from the plurality of pre-determined images.

11. The system of claim 10, further comprising:

a nearest neighbor machine learning model which, when executed by the processor, takes as input the plurality of pre-determined texts and the plurality of pre-determined images, and which generates the index as output.

12. The system of claim 10, further comprising:

a natural language machine learning model which, when executed by the processor, takes the input and generates the plurality of texts as output, wherein the plurality of texts comprises keywords that represent at least a portion of the input, and wherein the plurality of texts is represented as a vector.

13. The system of claim 10, wherein the server controller is further configured to:

generate the input by scraping a third party website;

receive a user selection of a selected image from the subset of images; and insert the selected image into an electronic document.

14. The system of claim 13, wherein the electronic document comprises an email, and wherein the server controller is further configured to:

format the selected image together with pre-determined email text into a plurality of different formatted emails;

receive, from a user, a selected email format from the plurality of different formatted emails; and return the selected email format.

15. The system of claim 10, wherein the server controller further comprises a Contrastive Language-Image Pre-training (CLIP) machine learning model, and wherein the server controller embeds the input into the first data structure by being programmed to:

receive, as input to the CLIP machine learning model, the plurality of images and the plurality of texts, and to generate, as output, the first data structure.

16. The system of claim 15, further comprising:

a training controller which, when executed by the processor, is configured to:

receive a plurality of emails containing a plurality of raw images and a plurality of associated raw text associated with the plurality of raw images;

extract a training portion of the plurality of raw images and the plurality of associated raw text, wherein, after extracting, a remaining portion of raw images and associated raw text remains;

generate, for the training portion, labeled data by labeling the plurality of raw images as being associated with the associated raw text;

embed the labeled data into a known vector; and train the CLIP machine learning model using the remaining portion as input and the known vector as a known result.

\* \* \* \* \*